Feb. 24, 1942.  E. B. GREEN  2,273,861

SCREW DRIVER

Filed Dec. 10, 1940

INVENTOR
Edgar B. Green
BY
W. Glenn Jones
ATTORNEY

Patented Feb. 24, 1942

2,273,861

UNITED STATES PATENT OFFICE 2,273,861

SCREW DRIVER

Edgar B. Green, Washington, D. C.

Application December 10, 1940, Serial No. 369,434

1 Claim. (Cl. 145—52)

(Granted under the act of March 3, 1883, as amended April 30, 1928; 370 O. G. 757)

This invention relates to a screw driver, and has for an object to provide an improved screw driver particularly adapted for inserting and removing screws from screw holes located in somewhat inaccessible positions, particularly in positions where it is difficult to insert one's fingers for either inserting the screw or for picking it up after it has been removed.

A further object of this invention is to provide an improved screw driver having means for gripping and holding the screw, either for starting or removing the screw from holding position.

Still a further object of this invention is to provide a retriever screw driver which may be adapted to hold different size screws by interchanging but a small part of the screw driver.

Still a further object of this invention is to provide a retriever screw driver which may hold not only the screw but a washer simultaneously therewith.

With the foregoing and other objects in view, the invention consists in the construction, combination and arrangement of parts hereinafter described and illustrated in the drawing, in which.

Figure 1:
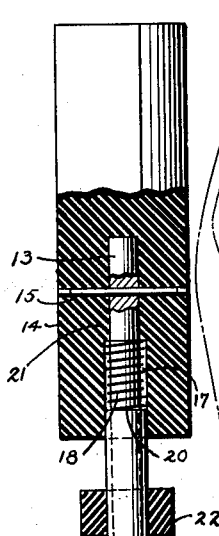
Fig. 1 is an elevational view of the screw driver of this invention about to pick up the screw, partly in section.

There is shown at 10 the screw driver of this invention, comprising a cylindrical shank 11 having a screw-engaging bit 12 formed at one end thereof, while its other end 13 is firmly embedded in a molded or insulating handle 14, being anchored thereto by means of a pin 15 extending therethrough.

Slidably mounted on the cylindrical shank 11 is a shift sleeve 16 extending into a counterbore 17 within the handle 14, a coil spring 18 being located between the end 20 of the shift sleeve 16 and the counterbore shoulder 21 within the handle 14, this coil spring 18 normally tending to hold the shift sleeve 16 in the extended position shown in Fig. 1. A collar 22 molded about the shift sleeve 16 serves as a handle means for drawing the shift sleeve 16 into the counterbore 17 while the yieldable coil spring 18 tends to return it to the position shown in Fig. 1.

Concentrically mounted on the lower end of the shift sleeve 16 adjacent the bit head 23, on which the bit 12 is formed, is a driver sleeve 24. Fixed to this driver sleeve 24 by a screw 25 is a leaf spring 26 having one end bent at right angles as at 27 to extend into a circumferential depression 28 in the shift sleeve 16. The other end of this leaf spring 26 is formed with a reverse hook 30 shaped as shown, and extending through a slot 31 formed in the driver sleeve 24 between the lower end of the shift sleeve 16 and the shoulder 32 at the back of the bit head 23. This shoulder 32 limits the outward movement of the shift sleeve 16 on the shank 11.

Figure 2:
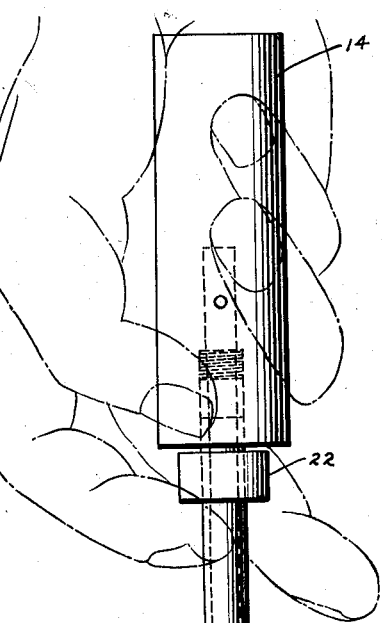
Fig. 2 is a similar elevational view in the position of discharging the screw.
Figure 3:
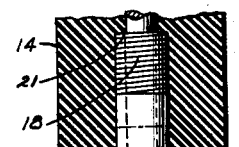
Fig. 3 is an enlarged detail sectional view with the bit in position on a screw.
Figure 4:
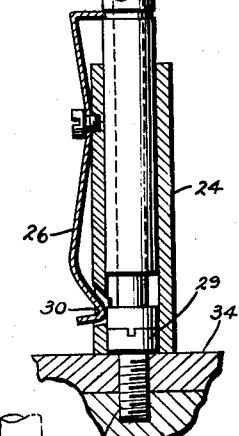
Fig. 4 is a longitudinal sectional view showing a larger screw holding sleeve for operation with a larger screw.
Figure 4:
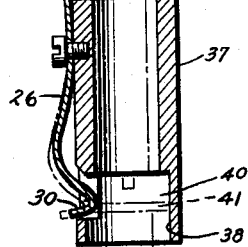
Figure 5:
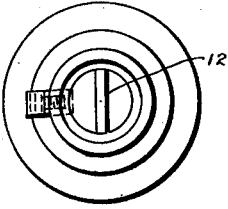
Fig. 5 is a bottom end view of the complete screw driver.

In operation, the internal diameter of the driver sleeve 24 is approximately equal to or very slightly greater than the external diameter of the screw head 29 of the screw 33 which is being used. To remove the screw 33 from any location, as from a piece of machinery 34, the screw driver is handled as in Fig. 2, with the fingers drawing the collar 22 of shift sleeve 16 upwardly, so that the driver bit 12 may be inserted into the screw kerf 35, as shown in Fig. 3. The screw driver is then rotated to withdraw the screw, the handle means 22 having meantime been released so as to cause the shift sleeve 16 under action of the spring 18 to move the driver sleeve 24 down over the head 29 of the screw 33. Continuous rotation of the screw driver in the proper direction will cause the screw 33 to move upwardly while the spring 18 causes the shift sleeve 16 to maintain the driver sleeve 24 in contact with the machinery portion 34 about the screw head 29. The screw head 29 will then move upwardly into the driver sleeve 24 until the reverse hook 30 of leaf spring 26 is against the side of or below the shoulder of the screw head 29 when the screw 33 is completely moved, thereby causing the screw driver to retrieve the screw and hold it in the position shown in Fig. 1, ready for easy removal therefrom with one's fingers.

To insert the screw the reverse procedure is followed, that is, the screw 33 is inserted in the end of the driver sleeve 24 as shown in Fig. 1, until the reverse hook 30 of leaf spring 26 holds it in such position. The screw driver is then manipulated to insert the end of the screw 33 into its threaded hole and upon rotation of the screw driver the spring 26 will gradually be withdrawn from the head 29 of the screw 33.

When a screw 36 of different size is to be used, a sleeve 37 having a counterbore 38 of a diameter substantially equal to the head 40 is substituted for the driver sleeve 24 by merely raising the end 27 out of its depression 28, permitting the sleeve 24 to be removed and permitting the driver sleeve 37 of larger size to be substituted therefor with its identical leaf spring operating in the identical manner.

As shown, a washer 41 may be placed about the screw 36 and likewise be held in position about the reverse hook 30 of leaf spring 26.

Other modifications and changes in the proportions and arrangement of the parts may be made by those skilled in the art without departing from the nature of the invention, within the scope of what is hereinafter claimed.

The invention described herein may be manufactured and/or used by or for the Government of the United States of America for governmental purposes without the payment of any royalties thereon or therefor Having thus set forth and disclosed the nature of this invention, what is claimed is:

A screw holder and retriever for use with a screw driver having a driver shank, a driver head and driver bit formed at one end thereof, a handle anchored to the other end of said driver shank, said handle being counterbored about said shank; said screw holder and retriever comprising a shift sleeve concentrically mounted on said shank having one end extendable into the counterbore of said handle, a coil spring within said counterbore between the counterbore shoulder and said shift sleeve, a handle means formed on said shift sleeve adjacent said shank handle, the other end of said shift sleeve stopping short of said driver head, a driver sleeve concentrically mounted on the driver end of said shift sleeve, yieldable means for removably securing said driver sleeve to said shift sleeve, a slot extending through said driver sleeve between said shift sleeve end and said driver head, said yieldable means also extending through said slot to yieldably hold a screw inserted therein when said driver sleeve is extended beyond said driver head.

EDGAR B. GREEN.